United States Patent [19]

Tsao et al.

[11] Patent Number: 4,698,219

[45] Date of Patent: Oct. 6, 1987

[54] TREATMENT OF WASTE FROM IRON ORE REDUCTION

[75] Inventors: Utah Tsao, Jersey City; Joseph Kettell, Fair Lawn, both of N.J.

[73] Assignee: Lummus Crest, Inc., Bloomfield, N.J.

[21] Appl. No.: 540,376

[22] Filed: Oct. 11, 1983

[51] Int. Cl.[4] ...................... C01B 31/24; C01B 17/16; C01F 11/18; C21B 17/04

[52] U.S. Cl. .................................. 423/563; 423/244; 423/242; 423/165; 423/178; 75/25

[58] Field of Search ............... 423/165, 168, 178, 431, 423/432, 563, 244 A; 75/25

[56] References Cited

U.S. PATENT DOCUMENTS

| | | | |
|---|---|---|---|
| 394,387 | 12/1888 | Parnell | 423/563 |
| 690,502 | 1/1902 | Wing | 423/165 |
| 2,611,682 | 9/1952 | Mannbro | 423/563 |
| 3,508,863 | 4/1970 | Kiminki et al. | 423/563 |
| 3,533,739 | 10/1970 | Pelczarski et al. | 423/563 |
| 4,060,588 | 11/1977 | Mandelik | 423/431 |
| 4,083,944 | 4/1978 | Chalmers | 423/574 L |
| 4,201,571 | 5/1980 | Scarlett et al. | 75/35 |

FOREIGN PATENT DOCUMENTS

| | | | |
|---|---|---|---|
| 2231755 | 3/1973 | Fed. Rep. of Germany | 423/563 |
| 57-47809 | 3/1982 | Japan | 75/25 |
| 57-47808 | 3/1982 | Japan | 75/25 |
| 80/831 | 5/1980 | World Int. Prop. O. | 423/431 |
| 7847 | of 1884 | United Kingdom | 423/563 |
| 2495 | of 1888 | United Kingdom | 423/563 |

Primary Examiner—Gary P. Straub
Attorney, Agent, or Firm—Elliot M. Olstein

[57] ABSTRACT

Spent flux containing calcium oxide and calcium sulfide, recovered from the reduction of iron ore, is carbonated, as an aqueous slurry, in two stages, with the first stage being operated at a pH to prevent reaction of calcium sulfide, and the second stage being operated at a pH at which calcium sulfide is reacted to produce an effluent gas containing hydrogen sulfide.

6 Claims, 1 Drawing Figure

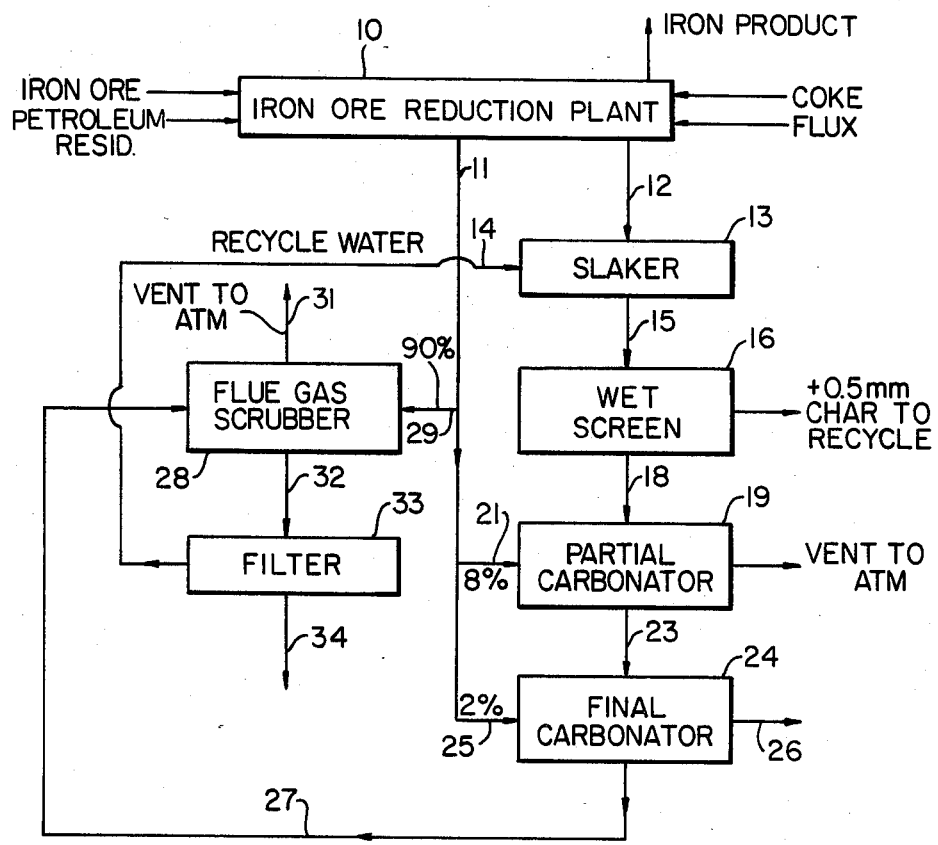

TREATMENT OF WASTE FROM IRON ORE REDUCTION

This invention relates to the reduction of iron ore, and more particularly, to the treatment of waste materials generated in such iron ore reduction.

Direct reduction of iron ore to produce "sponge iron" is an important growing method of producing iron suitable for conversion to steel.

In one such method for direct reduction of iron ore, a reduction kiln is used for reducing iron ore (lump or pelletized) by use of a solid carbonaceous reductant and flux for binding with the sulfur in the kiln (generally such sulfur is a part of the carbonaceous reductant) to thereby prevent such sulfur from combining with the metallized iron. In general, such flux is comprised of calcium carbonate, generally in the form of limestone or dolomite.

The kiln discharge is comprised of iron sponge product, excess carbonaceous reductant, generally as char, and spent flux, with such spent flux generally being comprised of calcium oxide and calcium sulfide. After cooling the solids, the solids are subjected to a screening operation in order to separately recover iron sponge product, carbonaceous reductant, and spent flux.

The spent flux presents a waste disposal problem in that the calcium sulfide present in the flux can react with carbon dioxide in the atmosphere to release hydrogen sulfide. In addition, the excess alkalinity of the flux (as a result of the presence of calcium oxide) is objectionable for landfill purposes.

Accordingly, there is a need for providing for improved treatment of waste generated in an iron ore reduction process.

In accordance with one aspect of the present invention, spent flux, which includes calcium oxide and calcium sulfide, is treated as an aqueous slurry in a first carbonating step with a gas containing carbon dioxide at a pH at which the gas is prevented from reacting with calcium sulfide to produce hydrogen sulfide. Subsequently, the aqueous slurry is treated in a second carbonation step with a gas containing carbon dioxide at a pH at which the gas reacts with calcium sulfide present in the flux to produce hydrogen sulfide.

By treating the spent flux in two separate carbonation steps, operated at different pH conditions, it is possible to prevent generation of hydrogen sulfide in the first crabonation step, and to recover hydrogen sulfide in a second carbonation step as a more concentrated stream. Moreover, the treated flux can be safely disposed of in a landfill in that the alkalinity has been reduced, and there is no longer a danger of generation of hydrogen sulfide.

More particularly, solids containing calcium oxide and calcium sulfide recovered from the direct reduction of iron ore, which solids may also include char, are slurried in water and subjected to treatment with a gas containing carbon dioxide at a pH at which the calcium sulfide present in the solids does not react, with such a pH generally being a pH of at least 9. The pH is controlled to a value of at least 9 by controlling the amount of carbon dioxide which is used in the treatment; thus, the amount of carbonation which is effected in the initial carbonation step is such that the pH of the aqueous slurry does not fall below 9. At such a pH, the calcium sulfide present in the solids does not react to generate hydrogen sulfide, whereby the gas which is removed from the initial carbonation step is free of hydrogen sulfide and may be vented to the atmosphere.

In accordance with a preferred embodiment, the gas containing carbon dioxide which is used in the initial carbonation step may be a portion of the flue gas generated in the iron reduction. As known in the art, such flue gas includes both sulfur dioxide and carbon dioxide, as well as other materials such as, for example, nitrogen, oxygen, carbon monoxide, etc.

The initial slurrying the solids in water, as well as the initial carbonation step may be represented by the following equations:

$$CaO + H_2O = Ca(OH)_2 \quad (1)$$

$$Ca(OH)_2 + CO_2 = CaCO_3 + H_2O \quad (2)$$

$$Ca(OH)_2 + SO_2 = CaSO_3 + H_2O \quad (3)$$

overall:

$$CaO + CO_2 = CaCO_3 \quad (4)$$

$$CaO + SO_2 = CaSO_3 \quad (5)$$

After the initial car the aqueous slurry of solids is introduced into carbonation zone wherein the solids are further carbonated by use of a gas containing carbon dioxide to a pH of below 8, with such carbonation converting any remaining calcium oxide (calcium hydroxide) to the carbonate (or sulfite if sulfur dioxide is present in the gas), and in addition, the calcium sulfide in the solids is carbonated to carbonate and hydrogen sulfide. If flue gas is employed as a source of carbon dioxide, such flue gas will also include sulfur dioxide, and such sulfur dioxide will react with the calcium sulfide to produce calcium sulfite and hydrogen sulfide.

The reaction of calcium sulfide with carbon dioxide and/or sulfur dioxide may be represented by the following equations:

$$CaS + CO_2 = CaCO_3 + H_2S \quad (6)$$

$$CaS + SO_2 = CaSO_3 + H_2S \quad (7)$$

The amount of gas which is used in the second separate carbonation step to complete the carbonation can be a small quantity, whereby the gas recovered from the second carbonation step will a higher concentration of hydrogen sulfide. In this manner, the gas recovered from the second carbonation step may be sent to a sulfur recovery unit to recover sulfur therefrom or be recycled to an incinerator to convert the hydrogen sulfide to sulfur dioxide.

In general, the second carbonation step (for completion of the carbonation) can be effected in a manner such that the concentration of hydrogen sulfide in the recovered gas is in the order of from 5% to 10%, by volume.

As in the first carbonation step, the source of the gas for accomplishing the second carbonation step is preferably the flue gas recovered from the direct reduction of iron ore.

In general, the first and second carbonation steps are accomplished at temperatures in the range of 150° to 190° F. depending upon the equilibrium temperature between the slurry and the hot flue gas and at a pressure 4 to 6 PSI above atmospheric pressure. The carbonation in the first and/or second step can be accomplished in a wide variety of contacting devices, such as, for example, in a column including a series of shower trays. The selection of suitable devices is deemed to be within the scope of those skilled in the art from the teachings herein.

In accordance with a preferred embodiment, the carbonated flux recovered from the second carbonation step may be employed for treating the portion of the flue gas recovered from the direct reduction step which is not used in the carbonators. In such an operation the sulfur dioxide reacts with calcium carbonate in the carbonated flux to produce calcium sulfite and carbon dioxide. Depending on the amount of oxygen in the flue gas, some or all of the calcium sulfite is oxidized to calcium sulfate. Such scrubbing of the flue gas may be operated at conditions which are generally known in the art to be suitable removing sulfur dioxide from gases.

The invention will be further described with respect to an embodiment thereof illustrated in the accompanying drawing, wherein:

The drawing is a simplified schematic block flow diagram of an embodiment of the invention.

It is to be understood, however, that the scope of the invention is not to be limited to the flow scheme illustrated in the drawing.

Referring now to the drawing, there is schematically illustrated as 10 a direct iron ore reduction plant wherein iron ore is directly reduced to produce iron. As known in the art, the direct iron ore reduction plant may include a suitable rotary kiln, which is provided with iron ore, a carbonaceous reductant (for example, in the form of coke) and flux, which includes calcium carbonate. The plant is operated at conditions as generally known in the art; for example, the reduction of iron ore may be accomplished at temperatures in the order of from 1600° F. to 2100° F.

In the direct reduction plant, iron ore is converted to iron, and in addition, the calcium oxide present in the flux is converted to calcium sulfide.

As a result of the reduction process, in addition to iron product, there is generated a flue gas in line 11, which contains carbon dioxide, sulfur dioxide, nitrogen, some oxygen and some carbon monoxide, and a finely divided solid, in line 12, comprised of char, calcium sulfide and calcium oxide. In general, the solids in line 12 have a particle size of less than 6 mm.

The solids in line 12 are introduced into a slaker, schematically generally indicated as 13, wherein the solids are slurried in recycle water provided through line 14. In general, a 15% to 20% slurry is formed in the slaker, and the calcium oxide present in the solids reacts with water to form calcium hydroxide. The calcium hydroxide is not very soluble in water, and as a result, the calcium hydroxide is suspended in the slurry as fine particles, along with the calcium sulfide, char and iron fines.

The slurry withdrawn from slaker 13 in line 15 is generally introduced into a separation zone, schematically generally indicated as 16 wherein particles of a size greater than 0.5 mm. are separated from the slurry and dried for recycle to the direct reduction plant. The recycled material contains mostly char with about 10% of iron which can be recovered magnetically.

The slurry withdrawn from separation zone 16 through line 18 is introduced into the first carbonation zone, schematically generally represented as 19, to effect a partial carbonation of the solids. The carbonation zone 19 is provided with a gas containing carbon dioxide, in the form of a portion of the flue gas from line 11, which is introduced into the first carbonation zone 19 through line 21. The amount of gas employed in line 21 is such as to accomplish a partial carbonation of the solids and to maintain the pH of the slurry at a value of no less than 9.0. In this manner, the calcium sulfide present in the slurry does not react with carbon dioxide and/or sulfur dioxide, whereby the gas vented from the first carbonation zone 19 through line 22 is free of hydrogen sulfide. The gas in line 22 may therefore be vented to the atmosphere.

The slurry withdrawn from the first carbonator 19 through line 23 is introduced into the second and final carbonator 24, which is provided with a carbon dioxide containing gas through line 25, in the form of a portion of the flue gas withdrawn from the iron ore reduction plant through line 11.

The amount of gas provided through line 25 is sufficient to reduce the pH to a value of below 8 and to convert calcium sulfide to calcium carbonate and/or calcium sulfite. In addition, the final carbonator 24 is operated in a manner such that the hydrogen sulfide is stripped from the aqueous slurry as a concentrated hydrogen sulfide stream which is recovered through line 26. The hydrogen sulfide containing gas which is recovered through line 26 may be subjected to a sulfur recovery operation or recycled to the incinerator of the iron ore reduction plant.

The carbonated slurry, which is free of calcium oxide (calcium hydroxide) and calcium sulfide, is withdrawn from the second carbonator 24 through line 27 and introduced into a flue gas scrubbing zone, schematically generally indicated as 28 which is provided with flue gas or off-gas from the iron ore reduction plant through line 29, which flue gas is the portion of the flue gas in line 11 which is not employed in line 21 or line 25. The scrubbing zone 28 is operated to effect contact between the slurry and flue gas provided through line 29 to thereby effect reaction between the calcium carbonate of the slurry and the sulfur dioxide in the gas so as to convert same to calcium sulfite. As previously indicated, in the case where oxygen is present in the flue gas in line 29, all or a portion of the calcium sulfite is converted to calcium sulfate.

The vent gas, essentially free of sulfur dioxide, is withdrawn from the flue gas scrubbing zone 28 through line 31.

An aqueous slurry of solids, primarily comprised of calcium sulfite, calcium carbonate, char fines, iron fines, and perhaps some calcium sulfate, is withdrawn from the flue gas scrubbing zone 28 through line 32 and introduced into a suitable separation zone, such as a filter, schematically generally indicated as 33.

Water recovered from the filtration zone through line 14 may be recycled to the slaker 13.

The solids recovered from separation zone 33 through line 34 are suitable for disposal in that they have a reduced alkalinity, and are free of calcium sulfide.

In general, from about 6% to about 10% of the flue gas generated in the iron ore reduction is employed in the first carbonator, with a smaller amount, generally in the order of from 1% to 3% of the total flue gas, being employed in the second carbonator 24.

The present invention will be further described with respect to the following example; however, it is to be understood that the scope of the invention is not to be limited thereby:

EXAMPLE

For an iron ore direct reduction plant to produce 250,000 tons of sponge iron per year, the −6 mm spent flux separated from the iron sponge amounts to 37.6 tons/hr containing 5.9% iron, 67.8% char, 23.9% calcium oxide, and 2.4% calcium sulfide. After the flux is slaked in slaker 13 (400° F.) with 60 tons/hr of 125° F. water including 20.6 tons/hr of make-up fresh water, the slurry is separated by a wet screen 16 into +0.5 mm and −0.5 mm fractions. The +0.5 mm fraction is washed with 15 tons/hr of water to produce a damp char mixture of 33.4 tons/hr containing 66.6% char, 5.5% iron, 0.9% calcium oxide and 27.0% water. This char mixture is dried and the iron is recovered by a magnetic separator. The remainder is recycled to the reduction plant. The −0.5 mm fraction stream 18 is a slurry of 79.3 tons/hr, and the suspension of fines contains 14.5% calcium hydroxide, 1.1% calcium sulfide, 4.2% char, 0.4% iron and 79.8% water. This slurry is sent to the partial carbonation 19 to be partially carbonated by 3.0 tons/hr 400° F. flue gas from an incinerator containing 13.1 mol % of water, 25.1% carbon dioxide, 0.4% sulfur dioxide and 61.4% nitrogen. The pH at the top of the carbonation should be maintained above 9 so that no hydrogen sulfide which may be released from calcium sulfide by carbon dioxide at the bottom will escape in the vent to the atmosphere. The partially carbonated slurry stream 23 is sent to the final carbonator 24 to be carbonated with 4 tons/hr of flue gas from the incinerator. The pH in the carbonator is maintained below 6.5 so that the calcium sulfide is decomposed by the carbon dioxide and sulfur dioxide in the flue gas and the released hydrogen sulfide is stripped out of the slurry. The 4.7 ton/hr vent gas from the carbonator containing 38.1 mol % water, 7.3% carbon dioxide, 4.8% nitrogen and 6.7% hydrogen sulfide is sent either to a sulfur recovery unit or to the incinerator. The stripped slurry stream 27 of 78 tons/hr containing 0.5% iron, 4.2% char, 19.4% calcium carbonate, 0.6% calcium sulfite and 75.3% water is sent to the flue gas scrubber 28 where the balance of 228 tons/hr of flue gas from the incinerator is scrubbed to remove the sulfur dioxide in the gas. The slurry stream 32 of 67.3 tons/hr, containing 0.5% iron, 4.9% char, 21.1% calcium carbonate, 4.6% calcium sulfite and 68.9% water, is sent to the filter 33 to remove most of the water. A filter cake of 25% water is produced from the filter for disposal.

The present invention is particularly advantageous in that it provides for effective treatment of solids recovered from a plant for directly reducing iron ore to iron.

Moreover, in accordance with a preferred embodiment, the off-gas from the plant, which contains sulfur dioxide, is also treated to remove sulfur dioxide therefrom.

In addition, the solids recovered from the process are suitable for disposal; for example, in a landfill, in that the alkalinity and calcium sulfide content has been reduced.

Furthermore, by effecting the carbonation in two separate and distinct stages, it is possible to prevent hydrogen sulfide from being generated in the first stage, and to generate hydrogen sulfide in the second stage for recovery as a concentrated small hydrogen sulfide stream. This permits economical recovery of sulfur or, in the alternative, the concentrated hydrogen sulfide stream can be recycled to the incinerator of the reduction plant for conversion of hydrogen sulfide to sulfur dioxide.

These and other advantages should be apparent to those skilled in the art from the teachings herein.

Numerous modifications and variations of the present invention are possible in light of the above teachings and, therefore, within the scope of the appended claims, the invention may be practiced otherwise than as particularly described.

What is claimed is:

1. In a process for directly reducing iron ore to iron wherein there is recovered a flue gas comprising carbon dioxide and sulfur dioxide and solids comprising calcium sulfide and calcium oxide, the improvement for treating said solids comprising:
   forming an aqueous slurry of said solids;
   reacting the aqueous slurry of said solids in a first carbonation zone, with sulfur dioxide and carbon dioxide in a first portion of said flue gas at a pH of at least 9.0 and at which calcium sulfide is prevented from reacting with the flue gas to release hydrogen sufide from the carbonation zone zone;
   recovering aqeuous slurry and a remaining gas from the first carbonation zone;
   reacting aqueous slurry recovered from the first carbonation zone in a second carbonation zone with carbon dioxide and sulfur dioxide in a second portion of said flue gas without use of said remaining gas at a pH below 8.0 and at which the gas reacts with calcium sulfide to release hydrogen sulfide from the second carbonation zone, said second portion being smaller than the first portion; and
   recovering solids from the second carbonation zone which are free of calcium oxide and calcium sulfide.

2. The process of claim 1 wherein a vent gas free of hydrogen sulfide is recovered from the first carbonation zone and an effluent gas containing hydrogen sulfide is recovered from the second carbonation zone.

3. The process of claim 2 wherein the effluent gas contains from 5% to 10%, by volume, of hydrogen sulfide.

4. In a process for directly reducing iron ore to iron wherein there is recovered a flue gas comprising carbon dioxide and sulfur dixode and solids comprising calcium sulfide and calcium oxide, the improvement for treating said solids comprising:
   forming an aqueous slurry of said solids; reacting the aqueous slurry of said solids in a first carbonation zone, with carbon dioxide and sulfur dioxide in a first portion of said flue gas at a pH of at least 9.0 and at which calcium sulfide is prevented from reacting with the flue gas to release hydrogen sulfide from the carbonation zone; recovering aqueous slurry and a remaining gas from the first carbonation zone; reacting aqueous slurry recovered from the first carbonation zone in a second carbonation zone with carbon dioxide and sulfur dioxide in a second portion of said flue gas without use of said remaining gas at a pH below 8.0 and at which the gas reacts with calcium sulfide to release hydrogen sulfide from the second carbonation zone, said second portion being smaller than the fist portion; recovering solids from the second carbonation zone which are free of calcium oxide and calcium sulfide; and contacting the remaining portion of the flue gas with an aqueous slurry of solids recovered from the second carbonation zone to scrub sulfur dioxide from the remaining portion of the flue gas.

5. The process of claim 4 wherein a vent gas free of hydrogen sulfide is recovered from the first carbonation zone and an effluent gas containing hydrogen sulfide is recovered from the second carbonation zone.

6. The process of claim 5 wherein the effluent gas contains from 5 to 10%, by volume, of hydrogen sulfide.

* * * * *

UNITED STATES PATENT AND TRADEMARK OFFICE
CERTIFICATE OF CORRECTION

PATENT NO. : 4,698,219

DATED : October 6, 1987

INVENTOR(S) : Utah Tsao et al.

It is certified that error appears in the above-identified patent and that said Letters Patent is hereby corrected as shown below:

Column 1, line 49, "crabonation" should read -- carbonation --.

Column 2, line 25, after "into" insert -- another --.

Column 2, line 31, after "to" insert -- calcium --.

Column 2, line 47, after "will" insert -- have --.

Column 6, line 22, Claim 1, line 12, after "carbonation" delete "zone".

Signed and Sealed this

Fourth Day of July, 1989

Attest:

DONALD J. QUIGG

*Attesting Officer*     *Commissioner of Patents and Trademarks*